United States Patent [19]

Smith

[11] E Patent Number: Re. 32,815

[45] Reissued Date of Patent: Jan. 3, 1989

[54] HEIGHT ADJUSTABLE CRUTCH

[75] Inventor: Alfred A. Smith, Seattle, Wash.

[73] Assignee: Guardian Products, Inc., Arleta, Calif.

[21] Appl. No.: 772,481

[22] Filed: Sep. 3, 1985

Related U.S. Patent Documents

Reissue of:

[64] Patent No.: 4,509,741
Issued: Apr. 9, 1985
Appl. No.: 454,985
Filed: Jan. 3, 1983

[51] Int. Cl.[4] ..... A61H 3/02

[52] U.S. Cl. ..... 135/69; 33/161; 33/174 D; 248/188.5; 135/75

[58] Field of Search ..... 135/69, 75, 68, 70, 135/65; 272/70.1, 70.2, 101, 102, 103; 33/161, 174 D; 248/188, 5; 138/108

[56] References Cited

U.S. PATENT DOCUMENTS

| | | | |
|---|---|---|---|
| 1,035,760 | 8/1912 | Walton | 135/69 |
| 1,505,081 | 8/1924 | Arndt | 135/69 |
| 2,554,653 | 5/1951 | Wisecarver | 135/68 |
| 2,614,332 | 10/1952 | Zadrozny | 135/69 X |
| 2,711,183 | 6/1955 | Lofstrand, Jr. | 135/69 |
| 2,777,692 | 1/1957 | Marzucco | 272/103 |
| 3,730,198 | 5/1973 | Johnston et al. | 135/69 |
| 4,386,466 | 6/1983 | Lee | 135/69 X |

FOREIGN PATENT DOCUMENTS

| | | | |
|---|---|---|---|
| 722428 | 11/1965 | Canada | 135/69 |
| 124911 | 4/1919 | United Kingdom | 135/69 |
| 1234053 | 6/1971 | United Kingdom | 135/69 |

*Primary Examiner*—Robert A. Hafer
*Assistant Examiner*—Arnold W. Kramer
*Attorney, Agent, or Firm*—Christie, Parker & Hale

[57] ABSTRACT

A height adjustable crutch having a bow comprised of a pair of hollow tubular vertical members which are angled downwardly toward each other with their lower extremities aligned in spaced-apart parallel relationship in their hollow tubular condition. A hollow tubular carrier is disposed between and in abutment with these tubular extremities and the three members are secured, as by bolt through them in the upper area where they are in abutment, and by an integral encircling element at their lower extremities, the encircling element being pinned at externally diametrically opposite points of abutment of such element with the extremities of the tubular members. The tubular carrier is orificed at selective intervals and receives an orificed telescoping foot member provided with at least one radially outwardly spring biased detent. This detent serves to lock the foot member in any disposition relative to the carrier when the detent is passed through any registering orifices of the carrier and foot member. The disposition of the foot member relative to this carrier may be changed by pressing the detent radially inwardly to where the foot member may then be slid upwardly or downwardly in relation to the carrier for redisposition and locking by the detent.

7 Claims, 3 Drawing Sheets

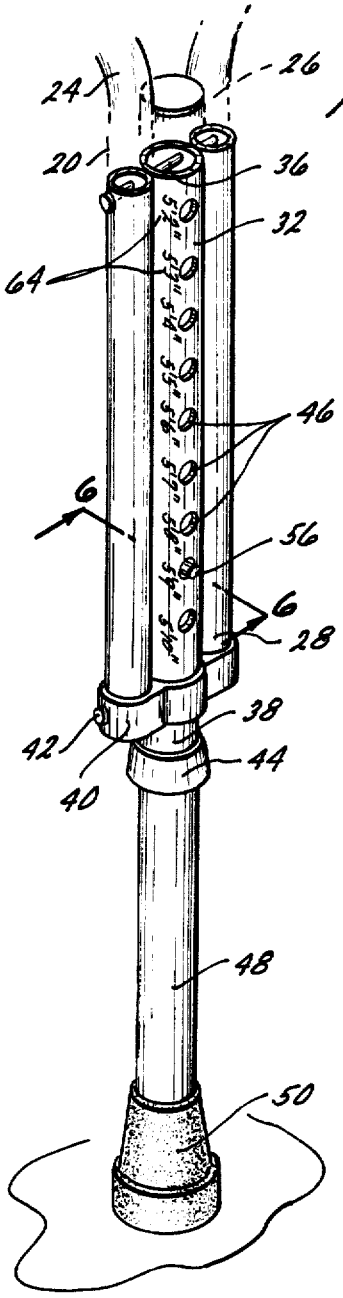
Fig. 5
Fig. 6
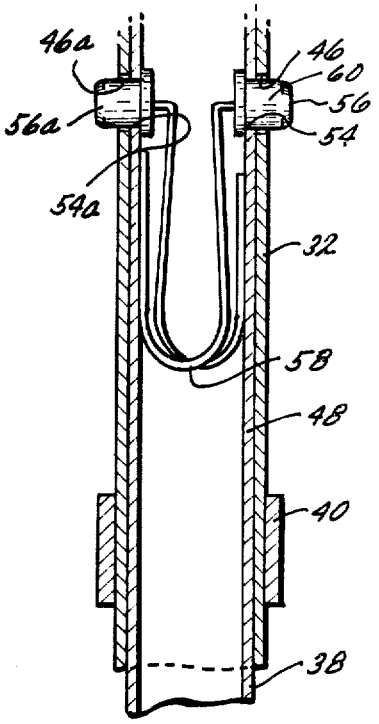
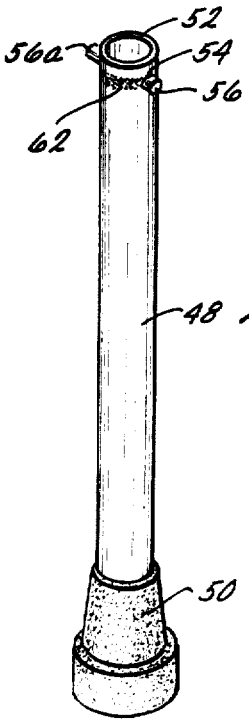
Fig. 7

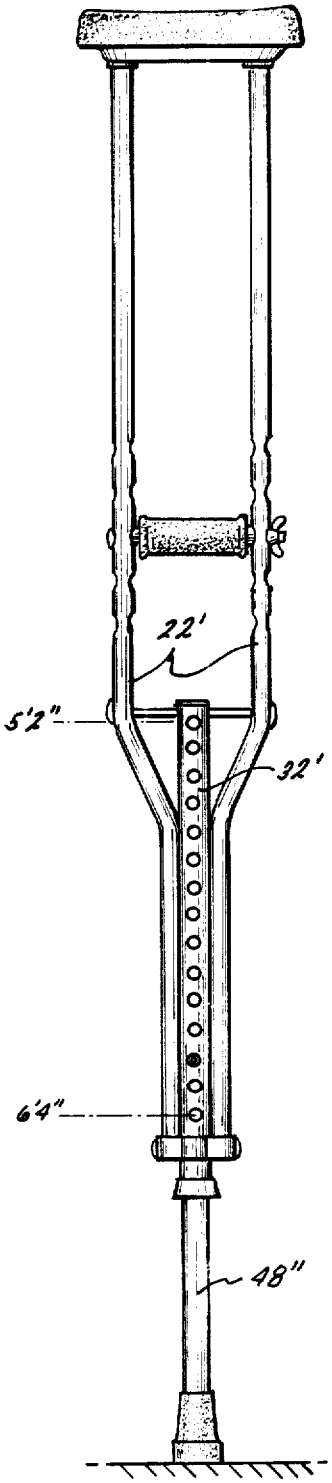
Fig. 8
Fig. 9
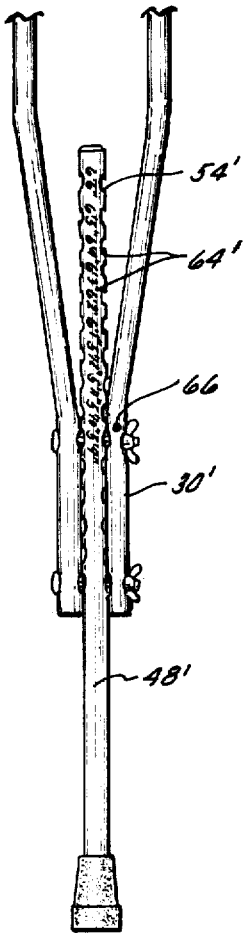

HEIGHT ADJUSTABLE CRUTCH

Matter enclosed in heavy brackets [ ] appears in the original patent but forms no part of this reissue specification; matter printed in italics indicates the additions made by reissue.

FIELD OF THE INVENTION

This invention relates to support devices for handicapped persons and is particularly applicable to height adjustable crutches.

DESCRIPTION OF THE PRIOR ART

Height adjustable crutches have been in use for many years. In one form, height adjustment has been accomplished by providing a laterally orificed foot member which may be secured between the parallel lower extremities of a crutch bow by means of at least a pair of bolts usually secured by wing nuts. While this has constituted a fairly simple form of height adjustable crutch, it is time-consuming to change the height of the crutch in that both wing nuts must be loosened and removed, the bolts withdrawn, and the foot member moved up or down relative to the lower parallel extremities of the bow, and then the bolts must be reinserted through orifices in both the bow extremities and orifices in the foot member which are brought in to register with the bow orifices. The wing nuts must then be turned onto the bolt ends and tightly secured to prevent their dropping off during use thereby permitting the bolt to slide out without knowledge of the crutch user. Should either bolt thus accidentally slip out of the orifices, the result would be that the foot member would then pivot about the remaining bolt thereby causing lack of support for the crutch user and possible serious injury.

More recently, a detent adjustable crutch has been made available. This prior art detent adjustable crutch has comprised a tubular carrier member being provided with a series of orifices and within which is telescopically carried a tubular foot member having a radially outwardly spring biased detent adapted to project outwardly through any of the series of orifices in the carrier member. In order to secure the tubular carrier member of the lower extremities of the crutch bow, such extremities have been flattened into configurations which are arcuate in cross section, and the carrier member has been extruded or otherwise formed with channels projecting radially outwardly to accommodate rivets or screws adapted to secure the carrier member to the flattened extremities of the bow without interference in the sliding movement of the foot member within the carrier. A problem with this prior art construction, however, is that by flattening the lower normally tubular extremities of the bow, a loss of strength in these extremities results. In addition, by securing the carrier to these arcuately flattened extremities of the crutch bow by means of rivets, use of the crutch produces such amount of stress in and around the rivets that the likelihood of fractures of the rivets and ruptures of the normally aluminum materials which the rivets secure together become quite great. When the carrier is no longer properly secured, there is greatly increased danger of the carrier and its encompassed foot member pivoting about those rivets which may still secure it. In addition, it will be found that either or both the flattened extremities of the bow or the carrier may become distorted through normal use to the point where the foot member may no longer be adjustably slidable within the carrier.

Another problem with the prior art detent type of crutch is in the difficulty in locating the detent once it is turned out of vertical alignment with the orifices in the carrier.

Prior art height adjustable crutches have also presented problems to the therapist or hospital personnel charged with providing the patient with properly sized crutches in that generally such sizing must be done initially by a guess on the part of the therapist or hospital personnel, followed by at least one trial and usually one or more resetting of the foot member relative to the lower extremities of the crutch bow.

BRIEF DESCRIPTION OF THE INVENTION

The present invention obviates the criticisms of prior art adjustable crutches and, particularly, of the prior art detent type crutch in that the lower extremities of the crutch bow need not be flattened, but, on the contrary, are left in their stronger tubular configurations. The upper end of the carrier, through which the upper end of the foot member does not slide, may be permanently secured by a bolt passed through both the bow members and the carrier. The lowermost ends of the bow extremities, together with the lower end of the carrier, are preferably secured by means of an integral element encompassing all three tubular sections and permanently secured to the outermost sides of the bow extremities. Thereby, distortion resulting from downward forces applied to the crutch is prevented and the foot member may be freely slid in and out of the carrier member. The carrier member is provided with a series of pairs of diametrically opposed holes which desirably are located a quadrant from each of the contacting lower extremities of the bow, and the foot member is provided with a diametrically opposed pair of detents, each being urged radially outwardly to snap into any pair of the series of orifices in the carrier member. Height adjustment may be effected by simply pinching radially inwardly the pair of detents and sliding the foot member up or down to align the detents with the selected pair of carrier orifices.

In this connection, such alignment may readily be accomplished by observing the marker line which runs semicircularly between each pair of detents on each side thereof. Selection of the proper pair of orifices may readily be determined by reference to the series of patient height markers which are placed, in one embodiment, on the outside wall of the carrier.

The present invention, therefore, provides a height adjustable crutch which will be found to be sturdy and durable, thereby eliminating danger to the patient, and may be readily adjusted by the therapist or hospital personnel, generally without the necessity of trial and error steps, where the height of the patient is known and such height may be translated into a proper setting of the detents in the orifices for such known patient height.

DESCRIPTION OF THE DRAWINGS

In the accompanying drawings:

FIG. 5 is an enlarged perspective view of the lower portion of the crutch of FIG. 3;

FIG. 6 is a section taken on the lines 6—6 in the direction of the arrows on FIG. 5;

FIG. 7 is a perspective view of the foot member shown in FIG. 5 and withdrawn from the carrier;

FIG. 8 is an elevation of a modified embodiment of the invention; and

FIG. 9 is a partial elevation of a prior art type of crutch to which the indexing system of the present invention has been applied.

DESCRIPTION OF THE PREFERRED EMBODIMENT OF THE INVENTION

Figure 3:
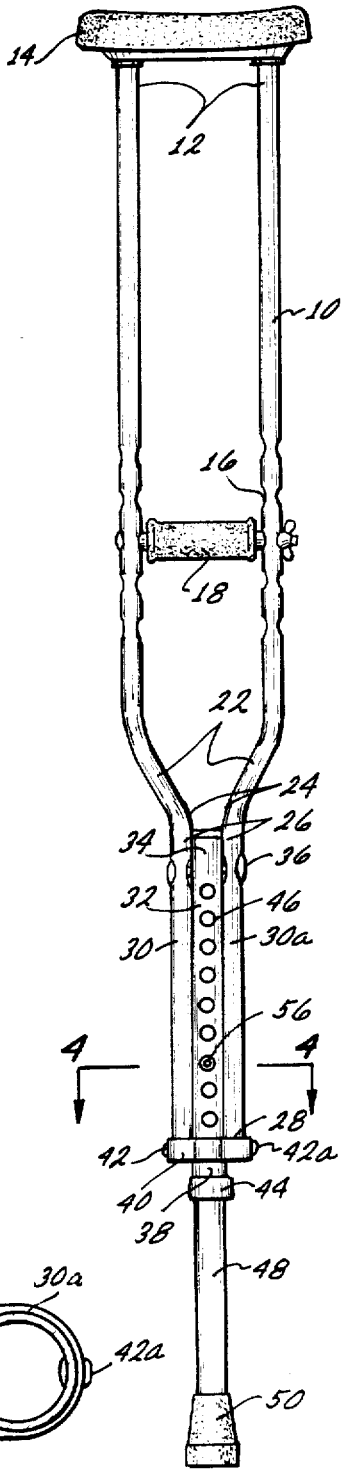
FIG. 3 is an elevation of the preferred embodiment of the present invention.
Figure 4:
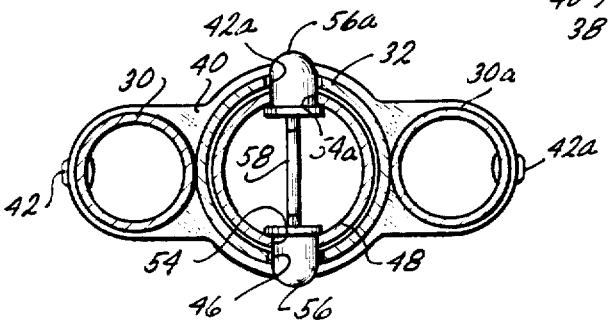
FIG. 4 is a section taken on the line 4—4 in the direction of the arrows on FIG. 3.

Referring to FIGS. 3 and 4 of the drawings, 10 represents the crutch bow which is bridged at its upper extremities 12 by an arm support 14 and at its midsection 16 by a handgrip 18. The lower section 20 of the vertical elements 22 of the bow are angled inwardly at 24 to where they are brought into spaced apart parallel alignment commencing at 26 and extending to their extremities 28 to provide a pair of parallel spaced apart extremity members 30 and 30a. Disposed and secured between the members 30 and 30a is a tubular carrier 32. The carrier 32 may be secured in the vicinity of its upper end 34 by a bolt 36 which extends from the outside of the element 30, through the latter, through the carrier 32, and through the member 30a where its extremity may be peened over to prevent withdrawal through the elements which it secures.

The lower end 38 of the carrier 32 may be secured to the lower extremities 28 of the members 30 and 30a by an integrally formed piece 40 which is configured as best shown in FIG. 4 to encompass the carrier 32 and the two members 30 and 30a, being secured to the latter by rivets or screws 42 and 42a respectively. In the embodiment shown in FIG. 3, the lower end 38 of the carrier 32 terminates in a rubber or plastic stop member 44. The carrier, desirably, may be provided with a series of pairs of diametrically opposite orifices 46, 46a as best shown in FIGS. 5 and 6 of the drawings.

Telescopically slidable within the carrier 32 is the crutch foot member 48, the lower extremity of which may be provided with a rubber or plastic tip 50, and near the upper extremity 52 of which are provided a pair of diametrically opposed orifices 54 and 54a (FIGS. 6 and 7). A pair of detents 56 and 56a are projected through the orifices 54 and 54a respectively and biased radially outwardly through said orifices by spring elements 58.

When the upper end 52 of the foot member 48 is pushed up into the carrier 32, at any point where the spring biased detents 56 and 56a fall into register with any of the pairs of orifices 46, 46a in the carrier 32, the detents will be pushed out through those orifices respectively, thereby locking the foot member against further axial displacement relative to the carrier 32 until the detents are squeezed by a person's fingers radially inwardly to where the rounded tips 60 will slip past the wall of the carrier 32 defining the orifices 46 and 46a. Thereupon the foot member 48 may be moved upwardly or downwardly relative to the carrier 32 until the detents 56 and 56a fall into register with another pair of orifices 46, 46a respectively in the carrier 32.

To enable the detents 56 and 56a to be brought into register with the desired pair of orifices 46, 46a respectively in the carrier 32, marker lines 62 are provided to extend semicircularly about each side of the detents 56, 56a.

Further, in order to enable the therapist or hospital personnel to set the crutch height properly for the prospective user of the crutch, the carrier 32, desirably, as shown in FIG. 5, is provided with a series of numerals 64, each of which has been empirically calculated with reference to the extension of the foot member 48 from the carrier 32 to indicate the average patient height for the setting of the detents 56, 56a and, hence, the extent the telescopic extension of the foot member 48 relative to the carrier 32. This height indicating system may also be applied to prior art crutches such as that illustrated in FIG. 9 where the numerical marks 64' are placed adjacent orifices 54' through the foot member 48' in reference to the index marker 66 disposed appropriately on one of the bow members 30'.

While the numerical height markers have been thus illustrated in certain dispositions, it will be appreciated that they could be placed in other locations as, for example, on the lower portion of the foot member 48 in reference to the carrier stop member 44, or on the bow members 30' in FIG. 9 with the indexing element 66 being placed on the foot member 48'.

FIG. 8 illustrates a modification of the embodiment of the invention shown in FIG. 3 wherein the carrier member 32' may be extended upwardly and secured between the more widely spaced sections 22' of the bow and bolted thereto, thereby to accommodate a longer foot member 48'' in order to enable the crutch to be employed by taller persons such as basketball players. Otherwise, the embodiment of FIG. 8 may be identical to that of FIGS. 3 and 4.

Figure 1:
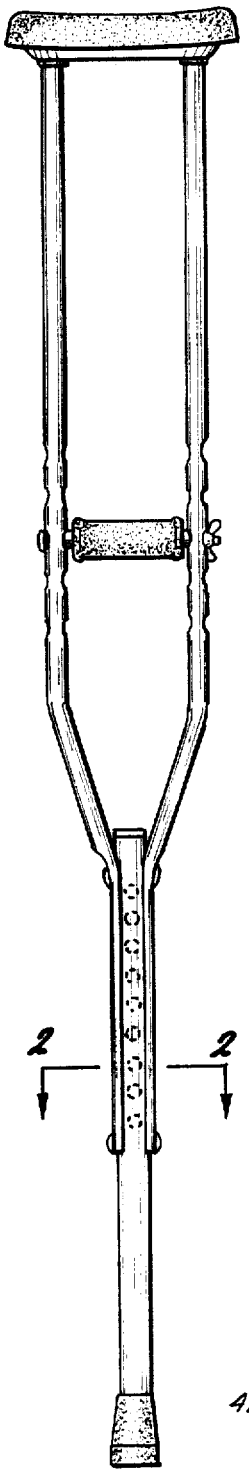
FIG. 1 PRIOR ART
FIG. 1 is an elevation of a prior art detent height adjustable crutch.
Figure 2:
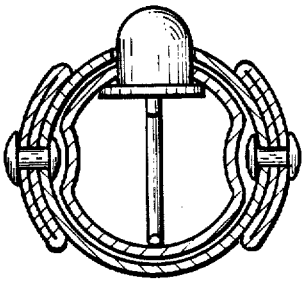
FIG. 2 PRIOR ART
FIG. 2 is a section taken on the line 2—2 in the direction of the arrows on FIG. 1.

From the foregoing description and the accompanying drawings, it may be seen that there is provided a sturdy, but readily height adjustable, crutch which obviates numerous objections to the prior art crutch illustrated in FIGS. 1 and 2 of the drawings. Thus, in the present invention, the inherent strength of the tubular configuration of the bow members 30, 30a is preserved while the carrier is secured between them most effectively by the integral element 40. In addition, the locking of the foot member 48 at a selected position relative to the carrier 32 is accomplished by the diametrically opposed detents 56, 56a. When the detents are pressed inwardly to permit telescopic movement of the foot member 48 relative to the carrier 32, if the resetting involves bypassing one or more pairs of carrier orifices 46, 46a, this may readily be accomplished by rotating the foot member 48 sufficiently to where the detents will not pop out of each pair of orifices 46, 46a as the foot member is moved axially relative to the carrier, but instead when the foot member 48 is properly disposed relative to the carrier 32, it is only necessary to observe one of the ring markers 62 through a carrier orifice 46 or 46a and then rotate the foot member circularly until the detents 56 and 56a pop out of the orifices 46, 46a respectively. Quick selection of the proper disposition of the foot member 48 in relation to the carrier 32 for a particular patient is readily ascertainable by aligning the correct height marker 64 on the carrier in reference to either the detents 56, 56a or the ring marker 62. Thus, not only does the present invention provide a safe, height adjustable crutch, but one which may rapidly be set with a minimum time expenditure on the part of a therapist or hospital employee to whom the task of providing the patient with a proper crutch is committed.

I claim:

1. A height adjustable crutch comprising:

(a) a bow having a transverse arm crutch support and a pair of vertical hollow tubular members extending downwardly from said support, said members being brought into closer but spaced apart parallel alignment for a predetermined distance from their lower extremities and maintained in their hollow tubular condition (b) a hollow tubular carrier, said carrier being disposed in the space between the lower extremities of said hollow tubular vertical members and in abutment therewith, said carrier being orificed at spaced intervals along at least one of its sides not in abutment with said lower extremities of said hollow tubular vertical members;

(c) first means securing the upper end of said carrier to each of said vertical members;

(d) second means securing the lower end of said carrier to each of said vertical members, said second means comprising an element encompassing externally each of said lower extremities of said vertical members and the carrier therebetween and secured externally at diametrically opposite points of contact to each of said extremities to prevent axial movement of said element relative to each said extremity; and (e) a telescoping foot member disposed for axial displacement within and relative to said carrier, said foot member being provided with at least one laterally projecting detent, said detent being spring-biased radially outwardly for projection through any of the orifices at spaced intervals along said carrier whereby, when said detent is so projected through any such orifice, the foot member is locked against telescoping movement relative to said carrier, but such movement may be effected by pressing the spring-biased detent radially inwardly thereby to change the disposition of the foot member relative to the carrier, for locking engagement at such changed disposition by projection of the detent outwardly through a different orifice in said carrier.

2. The height adjustable crutch as described in claim 1 wherein the carrier is provided with a pair of diametrically opposed orifices at spaced intervals and the foot member is provided with a pair of diametrically radially outwardly urged detents for projection through any of said pairs of orifices.

3. The height adjustable crutch as described in claim 1 wherein the foot member is provided with a marking ring in a plane normal to the axis of said foot member and passing through the detent thereby to enable the detent to be located in reference to any of said orifices at spaced intervals in said carrier.

4. The height adjustable crutch as described in claim 1 wherein indexing means are provided externally of the carrier to indicate the proper setting of the detent in each spaced orifice in the carrier for the particular height of the patient for whose use the crutch is intended.

5. The height adjustable crutch as described in claim 1 wherein adjustable handgripping means are provided at an appropriate location intermediate the arm crotch support and the carrier.

*6. A height adjustable crutch comprising:*

*(a) a bow having a transverse arm crutch support and a pair of vertical hollow tubular members extending downwardly from said support, said members being brought into closer but spaced apart parallel alignment for a predetermined distance from their lower extremities and maintained in their hollow tubular condition;*

*(b) a hollow tubular carrier, said carrier being disposed in the space between the lower extremities of said hollow tubular vertical members and in abutment therewith, said carrier being orificed at spaced intervals along at least one of its sides not in abutment with said lower extremities of said hollow tubular vertical members;*

*(c) first means securing the upper end of said carrier to each of said vertical members;*

*(d) second means securing the lower end of said carrier to each of said vertical members, said second means comprising an element encompassing externally each of said lower extremities of said vertical members and the carrier therebetween and means secured to each of said extremities to prevent axial movement of said element relative to each said extremity; and*

*(e) a telescoping foot member disposed for axial displacement within and relative to said carrier, said foot member being provided with at least one laterally projecting detent, said detent being spring-biased radially outwardly for projection through any of the orifices at spaced intervals along said carrier whereby, when said detent is so projected through any such orifice, the foot member is locked against telescoping movement relative to said carrier, but such movement may be effected by pressing the spring-biased detent radially inwardly thereby to change the disposition of the foot member relative to the carrier, for locking engagement at such changed disposition by projection of the detent outwardly through a different orifice in said carrier.*

*7. The height adjustable crutch of claim 6 wherein said first means is a bolt extending through both said vertical members and said carrier at a point above said orifices in said carrier.*

* * * * *